INVENTORS
IRA MORGAN WHITE - AND -
RAY BACCHI
BY
ATTORNEY

Aug. 28, 1951 — I. M. WHITE ET AL — 2,565,640
CONE VALVE OPERATOR
Filed Nov. 14, 1950 — 5 Sheets-Sheet 3

INVENTORS
IRA MORGAN WHITE -AND-
RAY BACCHI
BY
ATTORNEY

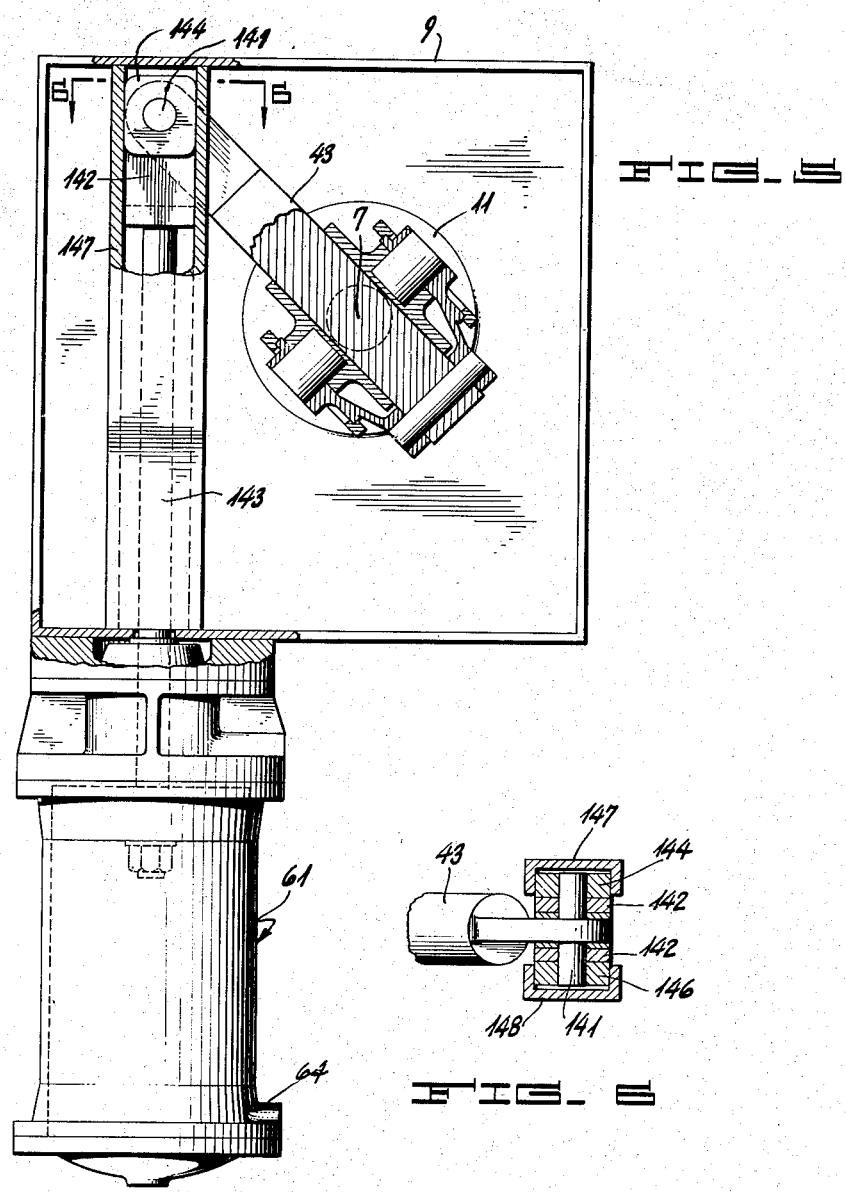

Aug. 28, 1951     I. M. WHITE ET AL     2,565,640
CONE VALVE OPERATOR
Filed Nov. 14, 1950     5 Sheets-Sheet 5
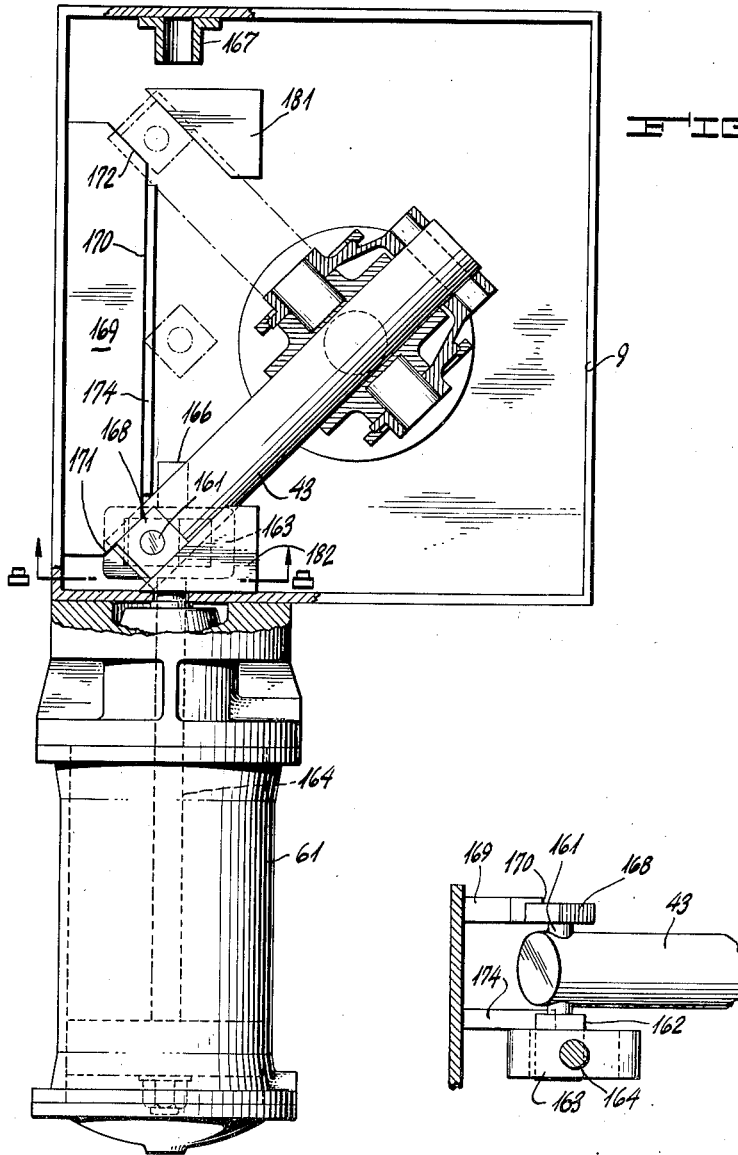
FIG_7
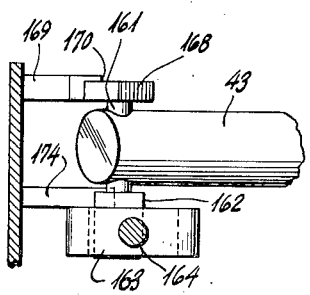
FIG_8
INVENTORS
IRA MORGAN WHITE AND
RAY BACCHI
BY
ATTORNEY Patented Aug. 28, 1951

2,565,640

UNITED STATES PATENT OFFICE 2,565,640

CONE VALVE OPERATOR

Ira Morgan White, Berkeley, and Ray Bacchi, Daly City, Calif., assignors to The Pelton Water Wheel Company, a corporation Application November 14, 1950, Serial No. 195,532

8 Claims. (Cl. 74—20)

Our invention relates to valves for controlling fluid flow and is especially concerned with cone valves rotated about a fixed axis between open and closed positions and which are lifted along such axis just prior to rotation and are lowered along such axis just after rotation. The problem of producing an appropriate lifting, turning and lowering motion of the valve is relatively difficult when the valve is of very large size; for example, in water works installations. The operating mechanism becomes bulky and elaborate although it must necessarily operate satisfactorily over a protracted period of time. Various operating structures have been patented, a representative one being Patent 1,890,678, issued December 13, 1932, to David Goldberg.

It is an object of our invention to provide a cone valve operator which is generally an improvement in this field.

Another object of the invention is to provide a cone valve operator effective to lift and turn a valve cone either in going from closed to open position or in returning from open position to closed position.

Another object of the invention is to provide a cone valve operator which functions quickly to lift and to turn and to lower the valve without substantial time lag and with simultaneous motion in several directions.

Another object of the invention is to provide a cone valve operator that lends itself well to very large installations requiring massive parts and capable of resisting heavy disturbing forces.

A still further object of the invention is to provide a cone valve operator that is readily made with ordinary machine tools and without highly finished surfaces or close tolerances but having, even so, the requisite accuracy of seating in both open and closed positions.

A still further object of the invention is to provide a cone valve operator in which the unit loads on the various operating parts are relatively low despite the massive nature of the valve itself so that long life and trouble free operation are readily attained.

Other objects, together with the foregoing, are attained in the various embodiments of the invention described in the accompanying description and illustrated in the accompanying drawings, in which Figure 1 is for the most part a plan of one form of cone valve operator in accordance with our invention, various parts being shown in cross section on a horizontal plane and some of the attendant mechanism being omitted for clarity of disclosure.

Figure 5 is a view similar to Figure 1 but showing a modified form of structure, certain parts being shown in cross section and other parts being omitted to clarify the showing.

Figure 6 is a cross section of a part of the actuating structure, the plane of section being indicated by the line 6—6 of Figure 5.

Figure 7 is a view similar to Figure 1 but showing a still further modified form of valve operator in accordance with our invention, the sectioning and omission of parts being substantially the same as in Figure 1 but with the valve being in an opposite position.

Figure 8 is a detail showing a part of the actuating structure in cross section on the line 8—8 of Figure 7.

Figure 3:
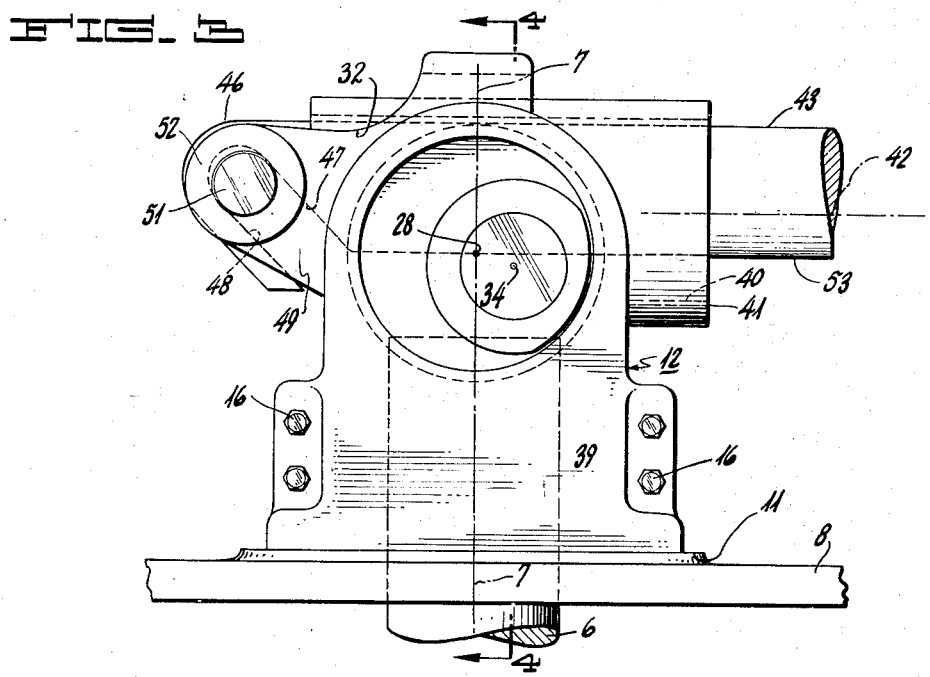
Figure 3 is a side elevation of a part of the operating mechanism, the view being generally along the line 3—3 of Figure 1.
Figure 4:
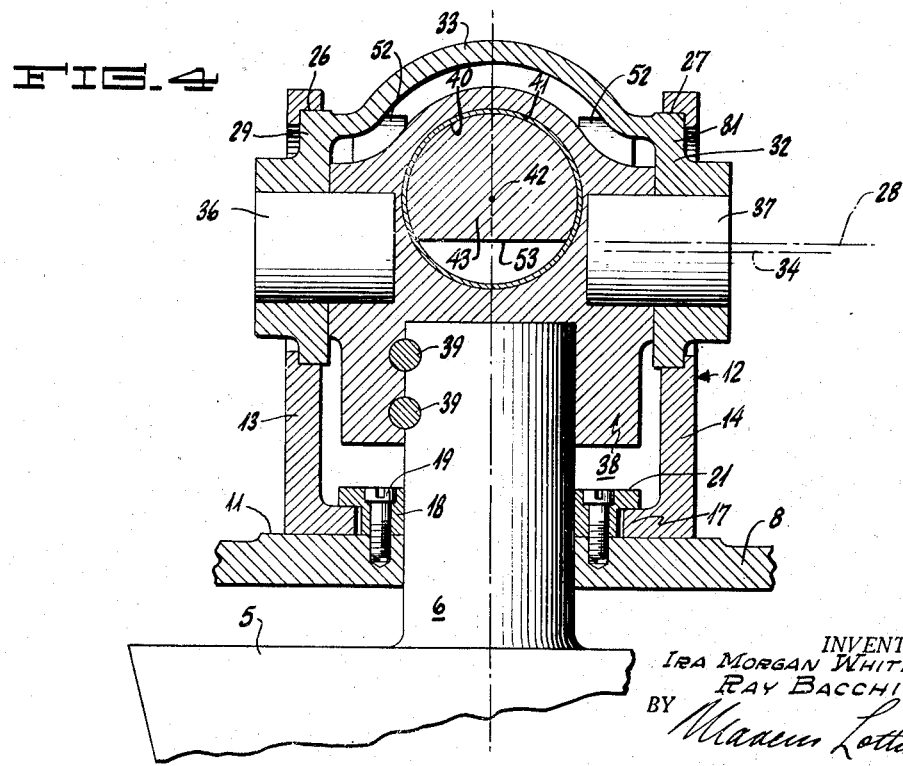
Figure 4 is a cross section, the plane of which is indicated by the line 4—4 of Figure 3.

The cone valve operator of our invention is applicable to various different styles of cone valves, the usual installation being in connection with a valve having a cone 5 (Figure 4) rotatable through substantially 90 degrees between its open and closed positions and having a stem 6 which is movable through that angle by rotation around a central axis 7 (Figure 3). The valve cone itself is disposed within a housing 8 having a top wall serving also as the base for an extended housing 9 (Figure 1) in part enclosing and supporting the valve operator.

The housing 8 is provided with a finished surface 11 normal to the axis 7 and encompassing the stem 6. Adapted to abut the normal surface 11 is a support frame 12 preferably fabricated in two halves 13 and 14 which have mirror symmetry with respect to each other and which are conveniently fastened together by through bolts 16. The support frame 12 is provided on its base with an inturned flange 17. A ring 18 bears against the flange and is fastened around the stem 6 by suitable machine screws 19. An upper flange 21 on the ring overlies the inturned flange 17. The diameter of the body portion of the ring is considerably less than the internal diameter of the inturned flange 17, so that while the support frame 12 is constrained against movement along the axis 7 with respect to the housing 8, the frame is free to rotate and is also free to slide in any direction normal to the axis 7.

The support frame itself is approximately or generally coaxial with the stem 6 and in its upper portion is formed to provide a pair of journals 26 and 27 in alignment on a transverse axis 28 in one position of the frame intersecting the axis 7. The journals 26 and 27 do not extend entirely through the support frame but rather are stepped to receive the corresponding bosses 29 and 31 of an integral forked lever 32. This lever is symmetrical about a plane through the axis 7 and is provided with a central bridge 33 which connects the bosses 29 and 31.

Mounted in the lever 32 on a transverse axis 34 displaced from or eccentric to the axis 28 are pivot pins 36 and 37 carried in the lever and extending inwardly toward each other. Supported on the pivot pins 36 and 37 and fitting snugly between the inside faces of the bosses 29 and 31 is a yoke 38 overlying and encompassing the upper end of the stem 6 and held firmly to such stem without possibility of motion relative thereto by a pair of through pins 39.

The yoke 38 also provides a support for part of the actuating mechanism for the valve and is consequently contoured to define a cross bore 40 on an axis 42 intersecting the axis 7 at right angles thereto. The bore 40 extends entirely through the yoke 38 and has an anti-friction lining 41 for the purpose of receiving a sliding, radial bar 43 preferably of completely or nearly completely circular cross section. The bar 43 is constrained against rotation about it own axis 42 and about the axis 7 unless, in the latter case, it turns in conjunction with the support frame 12. Thus, the radial bar 43 in rotating about the axis 7 carries the yoke 38 with it and because of the connections 39 between the yoke and the stem 6, the valve cone 5 is then similarly rotated about the axis 7.

Means are provided for utilizing the relative sliding movement of the bar 43 in the yoke 38 to afford movement of the cone stem 6 along its axis 7. One end of the slide bar 43 is shaped into a hook 46 providing a pair of parallel, inclined faces 47 and 48 leading to the outer margins of the bar so that an open notch 49 is formed. The inclined faces 47 and 48 of the notch 49 overlie or are disposed on the opposite sides of a pin 51 firmly anchored in the extended end bosses 52 of the forked lever 32. As the slide bar 43 is moved in a longitudinal direction, the inclined surfaces 47 and 48 produce a rotation of the pin 51 and of the lever as a whole about the axis 28, the rotational mounting axis of the forked lever in the support frame 12. Since the pin axis 34 is displaced from the pivot or fulcrum axis 28, the rotational movement of the forked lever produces a lifting or lowering movement of the yoke 38. The motion of the forked lever is of an arcuate character whereas the stem 6 is constrained by the housing 8 to movement along the axis 7. But the axis 34 is actually translated in a straight line for the axis 28 shifts transversely, normally to the axis 7, as the entire support frame 12 slides on the cover 8 along the surface 11. This sliding is permitted by the clearance between the inturned flange 17 and the central portion of the collar 18.

When the transverse or radial motion of the slide bar 43 is great enough, the pin 51 rides along the surface 47 and out of the notch 49. It is held depressed as it continues to be ridden over by the under surface 53 of the slide bar. The relationship between the slide bar 43 and the pin 51 thus affords a lost-motion connection. The weight of the valve cone is normally sufficient to insure engagement between these parts. During return sliding motion of the bar 43, the pin 51 rubs on the under surface 53 until such time as it encounters the notch 49. The cone weight is usually sufficient so that the pin follows along the surface 47 in returning to its original position with the valve cone lowered. But if the load should not be great enough, the extended or hook surface 48 is in the path of the pin and positively deflects the pin into the notch 49 so that the parts are surely restored to their cone down position, as shown in Figure 3.

Figure 1:
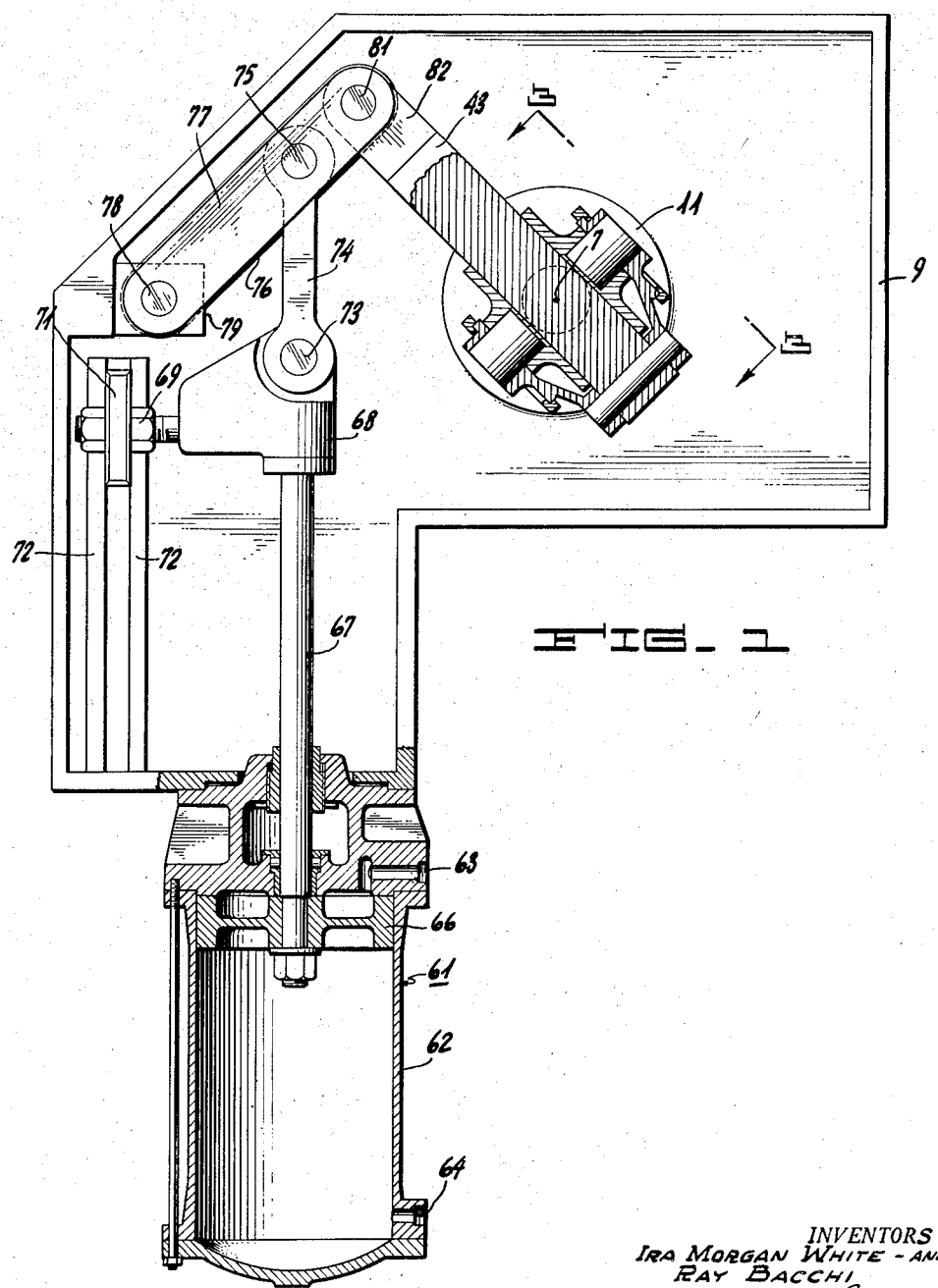

In order to produce sliding and rotary movement of the slide bar 43 and consequently the other motions described, we preferably locate on the housing 8 or on its extension 9 a suitable actuating or hydraulically expansible chamber mechanism 61 (Figure 1). This includes a cylinder 62 connected through ports 63 and 64 to a standard type of oil control mechanism (not shown) and likewise includes a piston 66 movable within the cylinder under the influence of the oil pressure to produce a corresponding axial movement of a piston rod 67. This rod is extended and fastened to a cross head block 68 having an extension 69 leading to a slide 71 reciprocable in a pair of guides 72 secured to the housing 9.

A pivot pin 73 in the cross head block 68 is constrained to rectilinear translation and is fastened to a link 74 at its opposite end joined by a pivot pin 75 to a pair of superposed twin levers 76 and 77. The levers are connected by a pivot pin 78 to an anchor 79 in the housing 9 and are also connected by a pivot pin 81 to the appropriately flattened outer end 82 of the slide bar 43. When the cross head block 68 reciprocates rectilinearly, the motion is transmitted by the link 74 to provide a rotary oscillation of the twin levers 76 and 77 so that the pin 81 moves in a path curved about the pin 78 as a center. This path is not concentric with but rather is eccentric to the axis 7 of the valve stem 6. When the levers 76 and 77 are moved through a circular path about the pin 78 as a center, the slide bar 43 simultaneously and correspondingly and in a proportionate amount is translated along its own longitudinal axis 42; that is, it is slid endwise in the yoke 38. The relative sliding movement so produced is effective to rock the forked lever 32 and to lift and to lower the valve stem.

The arrangement of the parts is such that in one extreme position with the valve seated, as shown in Figures 1 and 3, the slide bar 43 is not only in an extreme rotated position but is also in an extreme translated position. When the piston 66 is moved and the cross head block 68 follows, the pin 81 moving in an arc begins to rotate the slide bar 43 about the axis 7. But since the axis of the twin levers 76 and 77 is substantially at right angles to the longitudinal axis of the slide bar 43, the initial turning of the levers 76 and 77 produces no or only a very little rotation of the slide bar 43 about the axis 7. By the same token, the same initial rotation of the levers 76 and 77 produces a great deal of axial translation of the slide bar. That, coupled with the steep inclination of the surface 47 operates the forked lever 32 so that the axis 34 is quickly rotated around the axis 28. Although a rotational force and a lifting force are simultaneously exerted upon the valve stem 6, the rotational motion begins at zero and initially is relatively small in magnitude while the axial translation or lifting motion is relatively great in magnitude.

As the levers 76 and 77 continue to rotate, the pin 81 approaches the axis 7 and the rate of rotation becomes increasingly great. At some intermediate point, the flat 53 overrides the pin 51 and at that point and thereafter, the translational component becomes zero. When the levers 76 and 77 and the slide bar 43 are in their aligned, midstroke position, the slide bar has zero instantaneous translation and maximum velocity of rotation about the axis 7. The reverse motions take place through the final part of the movement of the levers 76 and 77 so that as they approach a position 90 degrees to that shown in Figure 1, less and less rotational movement is imparted to the slide bar 43 thereby rotating the cone valve finally with zero velocity in its ultimate, opposite position but giving an increasing axial component of movement to the slide bar 43. As the ultimate opposite position is approached, the notch 49 and the pin 51 rotate the forked lever 32 about the axis 28 so that the axis 34 relatively quickly drops and the cone valve sinks to its final, seated position.

The combined rotational and axial movements of the slide bar and the relative relationship or proportions of such movements during the full cycle of operation are such that the valve stem partakes of an almost pure lifting motion during its initial movement away from its seat accompanied by only slight rotation. The rotation increases greatly into center position accompanied by slight further lifting, then decreases with some lowering until close to the final seat the rotational component is quite small and the axial component toward seating is great. Actually, in practice, the parts are designed and made for some deflection under load and if the friction loads near the seated positions are made high, there may be no actual rotation of the valve body (as distinguished from the valve actuator) in and near seated position. But so far as the actuator motion is concerned, it endeavors to free the valve from its seat while it is being rotated from one position to another and while it is being rotated to position the valve firmly in its new seat. There is ideally no time lag before rotation during which time the valve is axially moved nor is there any time lag after rotation during which the valve body is reseated. The rotation is always simultaneous with the seating and with the unseating. In a test of a valve through some 10,000 cycles of operation with the described operator, the valve unseated and seated during the initial and terminal portions of its rotary actuation without any time lag and without any sticking, hesitancy or other failure.

Figure 2:
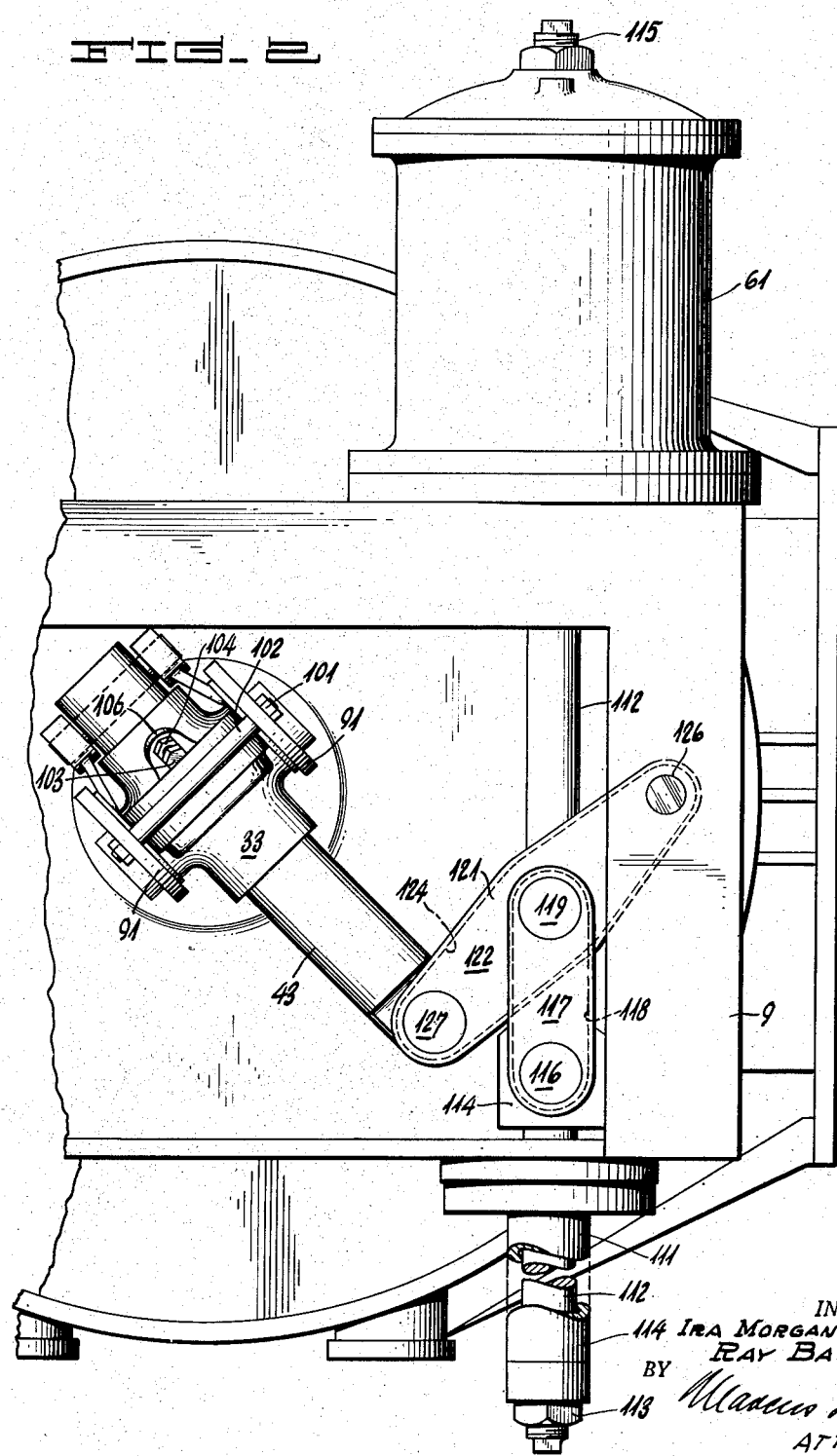
Figure 2 is a similar view showing a modified form of cone valve operator, various parts being omitted or broken away to reduce the size of the figure.

In Figure 2 there is disclosed a variant form of cone valve operator. While for the most part the structure near the valve is substantially the same, the split support frame 91 is continued upwardly and is braced across the top by a tie bolt 101 encased in a tube 102. A limit stop for rotary travel of the bridge mechanism is provided by a single adjusting screw 103 which with its lock nut 104 is mounted in an extension 106 of the bridge 33 joining the two sides of the forked lever 32. The adjusting screw 103 engages the surface of the yoke 38 limiting the travel of the forked lever 32 so that the pin 51 rides just under the surface 53 to ensure reengagement of the pin 51 with the surface 48.

In this version also, while the slide bar 43 and the expansible chamber 61 themselves are substantially the same as before, their interconnections are somewhat different. The housing 9 is reduced in extent and is provided with a tail tube 111 within which slides an elongated piston rod 112. The tail tube carries an adjustable stop 113 for one end of the extended piston rod and the cylinder 61 has an adjustable stop 115 for the other end of the piston rod.

At an appropriate point in its length, the piston rod is secured to a cross head 114 extending above and below the piston rod and carrying a through pivot pin 116 engaged by an upper link 117 and a corresponding lower link 118. The opposite end of the link 117 is connected by a pin 119 to the central portion of the upper arm 121 of a forked intermediate lever 122. Similarly, the lower link 118 is connected by a pin with the lower arm 124 of the intermediate lever 122 which itself is mounted on a pivot pin 126 set in the housing 9. The outer extremities of the upper arm 121 and of the lower arm 124 of the intermediate lever 122 are connected by a through pin 127 to the slide bar 43. The pin 127 follows an arcuate path concentric with the pin 126 as impelled by the upper link 117 and the lower link 118, which themselves also follow the rectilinear motion of the piston rod 112. Since the path of the pin 127 is not concentric with the rotational axis of the cone valve but rather is eccentric with respect thereto, the operation of the cone valve lifting and turning mechanism is substantially the same as previously described.

In this form of the structure, the mechanism, substantially a toggle, formed by the intermediate lever 122 and the slide bar 43 is actuated by swinging links 117 and 118 guided not only by the intermediate lever but also by the piston rod constrained to rectilinear motion by the cylinder 61 and by the tail rod guide 111. This arrangement is distinguished from the separate guide 72 provided at one side of the cross head 68 in the previous version.

A further departure is illustrated in Figures 5 and 6. The slide bar 43 within the housing 9 while otherwise similarly connected, is in this instance narrowed for much of its outer end to carry a pin 141 likewise received in the forked end 142 of a piston rod 143 extending from the expansible chamber mechanism 61. The piston rod is guided by blocks 144 and 146 mounted on the pin and slidably disposed in channels 147 and 148 spanning the housing 9 in a straight path. The channels 147 and 148 are spaced apart so that the slide bar 43 can project between them to engage the pin 141.

In this version of the device, when the expansible chamber 61 is actuated, the pin 141 is guided in a straight path. This path is not concentric with the axis of rotation of the cone valve but rather is eccentric thereto so that the slide bar 43 is moved first inwardly and then outwardly of the valve hub as the pin 141 proceeds from one side of the housing 9 to the other side thereof. Whereas in the previous instances the motion of the connecting pin 127 and the connecting pin 81 is an arc eccentric or convex to the axis of rotation of the valve, in the present instance, the motion is in a straight line spaced from or eccentric to the axis of the valve. In all instances, although the degree of motion is different, the same kind of relative motion is imposed upon the slide bar 43. Just as the bar 43 and the intermediate lever 122 form a substantial toggle and just as the slide bar 43 and the link 77 form an approximate toggle, it can also be considered that the slide bar 43 and the blocks 144 and 146 constitute a toggle since the blocks in effect are a lever of infinite radius.

In Figures 7 and 8 a further modification is illustrated. Here also the housing is connected to the expansible chamber mechanism 61. The slide bar 43, otherwise connected to structure substantially identical with that previously described, in this case is provided with a cross pin 161 at its outer end. The lower portion of the pin 161 is encompassed by a slide block 162 lying in its lower portion within a Scotch yoke 163 provided on the piston rod 164 of the expansible chamber mechanism. The Scotch yoke is therefore movable in a rectilinear path with the operation of the expansible chamber structure. A tail rod 166 is received in a socket 167 during the final travel of the expansible chamber mechanism to resist side forces.

Also mounted on the pin 161 is an upper block 168 turned diagonally with respect to the lower block 162 and adapted in general to engage a block guide 169 forming part of the housing 9 and having a rectilinear central portion 170 and bevelled or inclined end portions 171 and 172. When the expansible chamber mechanism is actuated to project the piston rod 164, the Scotch yoke mechanism 163 travels in a straight path and advances the lower block 162. This motion causes the upper block 168 to cam against the inclined surface 171 and to shift laterally, simultaneously shifting the slide bar 43 radially inward without any rotation about the axis of the valve cone and simultaneously shifting the block 162 transversely. This motion continues until the corner of the upper block 168 has just cleared the inclined surface 171. At that time, however, one side of the lower block 162 has already been laterally displaced sufficiently and advanced enough so that it is in sliding abutment with a lower guide 174 approximately parallel to the portion 170. For the balance of the motion in the intermediate zone of travel, the upper block 168 retains a diagonal position with one corner riding near the straight surface 170 of the upper guide 169 while the lower block 162 along one side rides in sliding engagement with the lower guide 174. The Sotch yoke 163 continues in a straight path and the slide bar 43 is moved in a path which is eccentric with regard to the axis of rotation of the valve cone. Thus, further inward motion followed by outward motion is produced as the bar 43 is also rotated during the intermediate part of the Scotch yoke travel.

Toward the far extremity of its movement, the piston rod advances the upper block 168 so that a leading diagonal face comes into abutment with an end guide 181 similar to a guide 182 at the opposite side of the housing 9. When that abutment occurs, the side face of the lower block 162 has just cleared the end of the lower guide 174. The final movement of the Scotch yoke 163 therefore causes the upper block 168 to move radially outward or away from the rotational axis of the valve cone without producing any further rotation of the slide bar 43. This final radial motion of the slide bar, without rotation, continues until the Scotch yoke has seated against the stop 167. Precisely the reverse motion occurs during the retraction of the piston rod 164 into the expansible chamber mechanism, the end block 182 serving at that end of the stroke to move the slide bar radially outward without rotation thereof.

In this form of the mechanism, while the slide bar outer end is always moved in a path that is eccentric relative to the valve cone axis, the initial and final motions of the slide bar are truly radial without any rotational component whatsoever. The intermediate portion of the slide bar motion is a radially inward and outward motion combined with a rotational movement. While this form of actuating device produces a somewhat similar motion to that of those previously described, it is distinct in that at the two extremes radial movement only without rotation is imparted to the slide bar. That radial movement is effective to provide a lifting action or a lowering action of the valve cone without any rotation of the cone.

What is claimed is:

1. A cone valve operator for use with a cone valve having a stem adapted to rotate and to move axially comprising a housing surrounding said stem, a support frame rotatably mounted on said housing approximately coaxially with said stem, a forked lever journaled in said support frame for motion about a transverse axis, pins projecting from said forked lever along an axis parallel to said lever axis, a yoke fast on said stem and receiving said pins, said yoke having a passage therethrough, a slide bar in said passage, mechanism for moving one end of said slide bar in a path eccentric of said stem, and a cam at the other end of said slide bar engaging said forked lever.

2. A cone valve operator for use with a cone valve having a stem adapted to rotate and to move axially comprising a housing surrounding said stem, a support frame rotatably and slideably mounted on said housing, a forked lever journaled in said support frame for motion about a transverse axis, pins engaging said forked lever on an axis parallel to said transverse axis, a yoke fast on said stem and engaging said pins, a slide bar constrained to slide on said yoke, mechanism for moving said slide bar in a path eccentric of said stem, and mechanism for transmitting motion between said slide bar and said forked lever.

3. A cone valve operator for use with a cone valve having a stem adapted to rotate and to move axially comprising a housing surrounding said stem, a support frame movably mounted on said housing and in abutment therewith to transmit compressive loads thereto, a lever journaled in said support frame for motion about a transverse axis, mechanism on said stem and engaging said lever, a slide bar slideably mounted with respect to said mechanism, mechanism for moving one end of said slide bar in a path eccentric of said stem, and a lost-motion connection between said bar and said lever.

4. A cone valve operator for use with a cone valve having a stem adapted to rotate and to move along its axis comprising a housing surrounding said stem and having a surface normal to said axis, a support frame abutting said surface and constrained against axial movement with respect thereto, a lever pivotally connected to said support frame and to said stem, a bar mounted to slide and to rotate with respect to said housing, mechanism for moving said lever in response to the sliding movement of said bar, and mechanism for rotating said stem in response to the rotation of said bar.

5. A cone valve operator for use with a cone valve having a stem adapted to rotate and to move along its axis comprising a housing, a support frame surrounding said stem and slideably and rotatably mounted on said housing, a lever pivoted between its ends on said support frame, a pivotal connection between one end of said lever and said stem, a radial bar slideably mounted on said stem, and an interengagement between said bar and the other end of said lever for moving said lever in response to sliding movement of said bar.

6. A cone valve operator for use with a cone valve having a stem adapted to rotate and to move along its axis comprising a housing, a lever in said housing, a pivot connection between one end of said lever and said stem, a support for said lever on said housing, a bar for rotating said sem and said lever and said support, an interconnection between said bar and the other end of said lever, and mechanism for moving said bar to pivot said lever.

7. A cone valve operator for use with a cone valve having a stem adapted to rotate and to move along its axis comprising a housing, a bar constrained to rotation and endwise sliding movement in said housing, mechanism for moving one end portion of said bar in a non-circular path about said axis, mechanism for connecting said stem and the other end portion of said bar for rotation in unison, and mechanism for translating said endwise sliding movement of said bar into movement of said stem along its axis.

8. A cone valve operator for use with a cone valve having a stem adapted to rotate and to move along its axis comprising a housing, a yoke rotatably mounted in said housing and constrained against axial movement therein, a bar mounted to slide radially in said yoke, an inclined surface on said bar, mechanism for simultaneously rotating said bar about said axis and sliding said bar in said yoke, mechanism for constraining said yoke and said bar to rotate together and for constraining said yoke and said stem to rotate together, and mechanism engaging said inclined surface and said yoke and said stem for constraining said stem to move along its axis in response to radial sliding of said bar in said yoke.

IRA MORGAN WHITE.
RAY BACCHI.

REFERENCES CITED

The following references are of record in the file of this patent:

UNITED STATES PATENTS

| Number | Name | Date |
| --- | --- | --- |
| 2,144,305 | Brisbane | Jan. 17, 1939 |
| 2,153,875 | Goldberg | Apr. 11, 1939 |
| 2,214,324 | Goldberg | Sept. 10, 1940 |